United States Patent [19]
Lee

[11] Patent Number: 5,643,983
[45] Date of Patent: Jul. 1, 1997

[54] MOISTURE CURABLE 100% SOLIDS ONE COMPONENT PLYWOOD ADHESIVE

[75] Inventor: Shang Lee, Dublin, Ohio

[73] Assignee: Ashland Inc., Russell, Ky.

[21] Appl. No.: 520,804

[22] Filed: Aug. 30, 1995

[51] Int. Cl.$^6$ .................................................. C08K 5/54
[52] U.S. Cl. ..................... 524/267; 528/45; 524/588; 524/590; 524/591
[58] Field of Search .................... 524/267, 588, 524/265, 590, 591; 428/425.1, 350, 355; 528/905, 903, 45; 252/301, 182.22, 182.2; 531/86

[56] References Cited

U.S. PATENT DOCUMENTS

| | | | |
|---|---|---|---|
| 3,621,000 | 11/1971 | Schmeizer et al. | 528/903 |
| 3,963,656 | 6/1976 | Meisert et al. | 524/267 |
| 5,290,853 | 3/1994 | Regan et al. | |

FOREIGN PATENT DOCUMENTS

| | | |
|---|---|---|
| 0122743 | 10/1984 | European Pat. Off. |
| 50-157504 | 12/1975 | Japan. |
| 51-140936 | 12/1976 | Japan. |
| 54-134739 | 10/1979 | Japan. |
| 54-134740 | 10/1979 | Japan. |
| 60-108414 | 6/1985 | Japan. |
| 60-108415 | 6/1985 | Japan. |
| 61-138639 | 6/1986 | Japan. |
| 62-101622 | 5/1987 | Japan. |
| 2-147685 | 6/1990 | Japan. |

OTHER PUBLICATIONS

American National Standard for Hardwood and Decorative Plywood, ANSI/HPVA HP-1-1994, approved Jan. 5, 1995. Hardwood Plywood & Veneer Associate P.O. Box 2789, Reston, Virginia 22909-0789 and American national Standards Institute, 11 West 42nd Street, New York, NY 10036.

Testing and Inspection Requirements for Wood Flush Doors, Industry Standard 1.S.1 for Wood Flush Doors, ANSI/NWMA I.S.1.6-80.

Nopco 8034 Defoamer for Synthetic Latex Systems, Data Sheet ARC-142 F-369 Mar. 1993 (Henkel Coatings & Inks).

Specialty Isocyanate Products For Coatings, Adhesives, Sealants and Encapsulants—ICI Polyurethanes.

Dow Corning Corporation Material Safety Data Sheet—Dow Corning Antifoam 1400.

Information About Silicone Antifoams—Dow Corning Corporation, Midland, Michigan, 1990.

MDI Isocyanate Binders vs. Conventional Resins, By: C. John Galbraith & Jessie L. Wells, Jan. 1991, *Panel World*.

*Primary Examiner*—Veronica P. Hoke
*Attorney, Agent, or Firm*—Mary E. Picken

[57] ABSTRACT

The method of this invention makes multi-ply wood composite laminates from several wood veneer sheets using a 100% solids single component adhesive mixture, prepared in the absence of water, of isocyanate terminated prepolymer, polymeric diisocyanate and polysiloxane or aliphatic cyclosaturated $C_{14}$–$C_{30}$ hydrocarbon.

6 Claims, No Drawings

MOISTURE CURABLE 100% SOLIDS ONE COMPONENT PLYWOOD ADHESIVE

FIELD OF THE INVENTION

The method and composition of this invention relate to making wood laminates with several layers of wood veneer using a 100% solids, storage stable mixture, prepared in the absence of water or solvent, of isocyanate terminated prepolymer and either polysiloxane foam control agent or aliphatic cyclo saturated $C_{14}$–$C_{30}$ hydrocarbon foam control agent.

BACKGROUND OF THE INVENTION

The consumption of wood has outpaced the growth of trees. One way to remedy the shortage of solid lumber is to make plywood. Plywood generally consists of several layers of wood veneers. The number of layers of plywood and thickness of veneers vary with different applications. For example, the plywood used for hardwood flooring generally has either 3-ply or 5-ply construction. The thickness of the veneer ranges from 1/32 inch to 3/8 inch. Wood veneer layers are laminated together with adhesive to form the solid wood composite plywood.

A wide variety of adhesives have been commercially used as wood bonding adhesives including phenol-formaldehyde, phenol-resorcinolformaldehyde, urea-formaldehyde, urea-melamine, melamineformaldehyde, polymeric diphenylmethane diisocyanate, water based polyvinyl acetate homo polymer or copolymer, tannin-based adhesive, and lining-based adhesive.

Polyurethane adhesives have also been used as wood to wood bonding adhesives. For example, Japanese patent 51140936 Dai Nippon describes urethane adhesives for bonding wet plywood veneer having moisture levels above 10%. This adhesive requires 3 to 5 hours at 80°–90° C. to react to form a polyurethane prepolymer which is melted and optionally dissolved in methyl ethyl ketone solvent before use. The Japanese patent 56104980 polyurethane adhesive contains polyvinylpyrrolidone and is used to bond wooden veneer irrespective of the water content in veneer. Japanese Patent 2147685 describes a two component polyurethane adhesive suitable for bonding wood at room temperature providing thermally stable, dry and wet adhesion. Japanese Patent 3244687 identified a two component adhesive containing polyol as one component and isocyanate as another component. This two component room temperature curable adhesive is suitable for adhering aggregated wood material and has heat and water resistance. Japanese Patent 6143202 describes a moisture curable adhesive with talc filler for bonding plywood by cold pressing plywood first, followed by hot pressing. Japanese patent application 50 [1975]-157504 describes a two-component polyurethane adhesive for use on wet undried wood veneer. The first component is isocyanate terminated prepolymer, the second component is a polyol curing agent. The water content of the veneer was 30% or greater and sometimes reached 100–150%.

Commercially available moisture curable polyurethanes have been used as laminating adhesives to bond plastic sheet, metal sheet, foam sheet and particle board to plywood. Moisture curable polyurethane adhesives have also been used to bond wood veneers to make plywood with a cold press process.

Most hardwood floorings are made from different numbers of layers of wood veneers; the most common is 3 layer or 5 layer construction. Each slice of wood veneer has a thickness of 1/32 inch to 3/8 inch. Wood veneer has various levels of moisture and may have 2, 4, 6, 8, 10, 12% or higher. The construction of plywood can consist of different wood veneers. Within one laminate, for example, one popular wood flooring is maple-poplar-maple veneer. The commercially available adhesives require a cure time upwards from 4 minutes, with 200° F. (93.3° C.) press temperature. Furthermore, if the adhesives contain water, the press temperature will be further restricted to below 250° F. (121.1° C.) to prevent an explosion from over-and sudden-heating water.

DESCRIPTION OF THE INVENTION

The method of this invention uses a one component moisture curable polyurethane to bond wood veneers, and eliminates the constraint of press temperature so that press temperature can be set up as high as possible. The adhesive of this invention is a mixture prepared in the absence of solvent or water. Water is used in the method of this invention in the misting step which is done after the adhesive mixture is applied to the veneer. Since there is so little water, temperatures can be high, by adjusting press temperature upward, the press time can be 2 minutes or less. In addition, this adhesive also provides a dramatic improvement on bonding very hard to bond veneers such as raw maple, polymethyl methacrylate impregnated maple and oak as evaluated in the Type II, three cycle soak test, an interim voluntary standard for hardwood flooring and decorative plywood of the Hardwood Plywood and Veneer Association, Reston, Va. and American National Standards Institute, New York as ANSI/HPVA HP-1-1994. Exterior doors, often made with five ply (oak or mahogany, hardboard or tupelo, particle board, hardboard or tupeloy, oak or mahogany) must pass the tougher Type 1 two cycle boil test for hardwood veneer doors as published by the National Woodwork Manufacturers Association, the American National Standard (ANSI) NWMA I.S. 1.6-80. Industry Standard for Wood Flush Doors.

DESCRIPTION OF THE PREFERRED EMBODIMENTS

This invention is a 100% solids one component, solvent-free moisture curable polyurethane adhesive containing one of two foam control agents and optional organo titanates. Unlike two component adhesives which must be mixed by the operator immediately before use, this one component adhesive is easy to use, requiring no mixing. Water is misted on the surface of the adhesive after the adhesive is spread on the substrate veneer. The amount of misted water preferably is 10 to 30% of the weight of the applied adhesive. Water is the sole "curing agent" in the adhesive of this invention. The adhesive can be heat cured to bond wood veneers in 2 minutes or less at press temperatures at 250° F. (121.1° C.) and above.

The moisture curable polyurethane consists of isocyanate terminated polyol prepared from an excess of multi-functional aromatic isocyanate and a hydroxy terminated multi-functional polyether polyol.

The multi-functional aromatic isocyanates are Mondur MR or MRS polymeric MDI (diphenyl methane diisocyanate) available from Bayer, with functionality ranging from 2.0 to 2.8, and PBA 2310-1 polymeric MDI available from ICI. Typical polyethers consist of homo and co-polymer (both block and random) of ethylene oxide and propylene oxide such as Poly G-20-56 polyether polyol of 2000 molecular weight available from Olin Chemical. This adhesive also optionally contains dibutyl tin dilaurate catalyst and/or benzoyl chloride inhibitor. The additives that improve the water resistance bond strength based on the three cycle soak test, are an antifoamer such as Dow Corning polydimethyl siloxane antifoamer 1400, or Nopco 8034, aliphatic cyclosaturated $C_{14}$–$C_{30}$ hydrocarbon antifoamer both of which are compatible with polyurethane adhesive and organo titanates such as titanium acetylacetonate. The terms "antifoamer" and "foam control agent" are synonymous. The final 100% solid, single component moisture curable polyurethane has a viscosity ranging from 1500 to 15,000 centipoise and it is roll coatable and extrudable.

Unlike two component adhesives such as that in Japanese application 2 [1990] 147685, which can only be mixed immediately prior to use to avoid premature reaction and gelling, the one component adhesive of this invention is storage stable after preparation at least as long as one year at ambient temperature.

EXAMPLE 1

The moisture curable polyurethane prepolymer was prepared by charging poly G-20-56 polyether polyol in the amount of 510 grams into a reactor blanketed with argon. Then PBA 2310-1 polymeric MDI with functionality of 2.0 in the amount of 402 grams was added with mixing. The temperature was raised to 195° F. (90.5° C.) and held for 45 minutes. The isocyanate of the prepolymer was 10.15–10.59%. Mondur MRS isocyanate was then added. After cooling to room temperature, 0.92 grams benzoyl chloride inhibitor and 0.92 grams dibutyl tin dilaurate catalyst were added to the polymer followed by differing amounts of water free antifoamer while the reactor remained under the argon blanket to compound the moisture curable 100% solids adhesive of the invention and various controls as set forth in the table. Three ply laminates were prepared using the following steps: Results are reported in the Table.

1) Adhesives were spread evenly on both sides of center (or core) veneer. The water content of the veneer was 4 to 12%. Spread rate ranged from 11.52 to 14.4 grams per square foot.

2) Water misting amount on adhesive being applied on veneer was 10% of adhesive spread rate.

3) The thickness of veneer was 1/8 inch, the core veneer was sandwiched between two other veneer sheets.

4) Pressing was done at:

300° F. temperature. 100 psi pressure for 2 minutes Testing results as per Type II, 3 cycle soak test for plywood.

| SAMPLE | 1 | 2 | 3 | 4 | 5 | 6 | 7 | 8 | 9 |
|---|---|---|---|---|---|---|---|---|---|
| PREPOLYMER | 100 | 100 | 100 | 100 | 100 | 100 | 100 | 100 | 100 |
| MONDUR MRS | 30 | 25 | 25 | 25 | — | 25 | 25 | 25 | — |
| TITANIUM ACETYL ACETONATE | 1.2 | — | — | — | — | — | — | — | — |
| HYDROCARBON ANTIFOAMER | — | — | — | — | — | 1.0 | 2.0 | — | — |
| POLYSILOXANE ANTIFOAMER | 1.8 | 1.0 | 1.5 | 2.0 | 1.0 | — | — | 1.0 | — |

(A) Construction of plywood: 3 plys, raw maple/raw maple/raw maple

| Results | — | Pass | Pass | Pass | Pass | Fail | Pass | Pass | Fail |
|---|---|---|---|---|---|---|---|---|---|

(B) Construction of plywood: 3 plys, impregnated maple/poplar/raw maple

| Results | Pass | Pass | Pass | Pass | Fail | Fail | Fail | Pass | Fail |
|---|---|---|---|---|---|---|---|---|---|

These examples demonstrate the improvement antifoamer additives provide when added to the 100% solid moisture curable polyurethane adhesive. Without antifoamer in the adhesive, the plywoods laminated with this adhesive failed on the Type II, 3 cycle water soak test. In contrast, the adhesives with antifoamer passed the Type II, 3 cycle water soak test. The adhesive with organo titanate on impregnated maple passes the 3 cycle water soak test.

EXAMPLE 2

The moisture curable polyurethane prepolymer was prepared by charging poly G-20-56, a polyether polyol with molecular weight 2000, in the amount of 500 grams into a reactor blanketed with nitrogen. The Rubinate M multifunctional aromatic diphenylmethane diisocyanate in the amount of 548 grams was added with mixing. The temperature was raised to 50° C. and held there for two hours. The free isocyanate was 14.0– 15.0%. After cooling to room temperature 1.05 gram benzoyl chloride and 1.05 grams dibutyltin dilaurate were added.

Five ply laminates were prepared using the following steps. Results are reported in the Table.

(1) Adhesive was spread evenly on both sides of the second and fourth plys of veneer. The spread rate was 4 grams to 10 grams per square foot.

(2) Water misting amount onto adhesive applied on veneer was 20% of adhesive spread rate.

(3) The 9/16 inch particle board center core was framed with solid oak stiles. The top and bottom veneers were 1/32 inch thick. The second and fourth plys were 1/16 inch thick phenolic impregnated hard board.

(4) Pressing was done at a platen temperature of 250° F.; 100 psi for 2 minutes.

Testing results reported are the Type I, 2 cycle boil test for hardwood veneered door.

| sample | 1 | 2 |
|---|---|---|
| prepolymer | 100 phr | 100 phr |
| Dow Corining 1400 poly dimethyl siloxane antifoamer | — | 1.0 phr |

(A) 5 plys veneered door construction

| oak/hard board/solid particle board core/hardboard/oak | | |
| --- | --- | --- |
| sample | 1 | 2 |
| results | fail | pass |

(B) 5 plys veneered door construction

| mahogany/hard board/solid particle board core/hardboard/mahagony | | |
| --- | --- | --- |
| sample | 1 | 2 |
| results | fail | pass |

I claim:

1. A 100% solids one-part moisture curable adhesive composition prepared under argon or nitrogen in the absence of water, filler and solvent, for use in making laminates of wood veneer by hot pressing for 4 minutes or less, comprising the storage stable mixture of
   a) 100 parts of an isocyanate terminated polyurethane prepolymer, and
   b) 1 to 4 parts of a water-free polydimethyl siloxane foam control agent.

2. The composition of claim 1 further comprising
   c) polymeric diphenyl methane diisocyanate.

3. The adhesive of claim 2 comprising 100 parts a, 1 to 4 parts b and 25 parts c.

4. The adhesive of claim 1 wherein said isocyanate terminated prepolymer is prepared by reacting polyether polyol with polymeric diphenyl methane diisocyanate.

5. The adhesive of claim 1 wherein said prepolymer has 8 to 16% free isocyanate groups.

6. The adhesive of claim 2 further comprising
   d) benzoyl chloride inhibitor of the reaction of prepolymer and water, and
   e) dibutyl tin dilaurate catalyst for the reaction of isocyanate and water.

* * * * *